UNITED STATES PATENT OFFICE.

EUGEN ANDERWERT, HERMANN FRITZSCHE, AND HEINRICH SCHOBEL, OF BASEL, SWITZERLAND, ASSIGNORS TO SOCIETY OF CHEMICAL INDUSTY IN BASLE, OF BASEL, SWITZERLAND.

SUBSTANTIVE ORTHOOXYAZO DYESTUFFS AND PROCESS OF MAKING SAME.

1,282,355.   Specification of Letters Patent.   Patented Oct. 22, 1918.

No Drawing.   Application filed October 7, 1915.   Serial No. 54,513.

*To all whom it may concern:*

Be it known that we, EUGEN ANDERWERT, HERMANN FRITZSCHE, and HEINRICH SCHOBEL, all three chemists and citizens of the Swiss Republic and residents of Basel, Switzerland, have invented new Substantive Orthooxyazo Dyestuffs and Processes of Making Same, of which the following is a full, clear, and exact specification.

We have found that valuable new polyazodyestuffs can be obtained by combining an aromatic orthooxydiazocompound, that is to say the diazoderivative of an orthoaminophenol compound or of an orthoaminonaphthol compound or a further diazotized orthooxymonoazodyestuffs, with a disazodyestuff containing at least one azodyestuff component able to combine with two diazogroups appertaining to different diazobodies, as for instance resorcinol, metaaminophenol, metaphenylenediamin, 2:7-dioxynaphthalene, an aminonaphthol, 1:8:4-aminonaphtholsulfonic acid, 1:8:3:6-aminonaphtholdisulfonic acid, 1:8:5-aminonaphtholsulfonic acid, 1:8:4:6-aminonaphtholdisulfonic acid, 2:5:7-aminonaphtholsulfonic compounds, 2:5:1:7-aminonaphtholdisulfonic compounds, etc. The most valuable dyestuffs are obtained when the molecule of the dyestuff contains also 2:5:7-aminonaphtholsulfonic acid or 2:5:1:7-aminonaphtholdisulfonic acid or one of their derivatives. The disazodyestuff employed as parent material can be derived from the tetrazoderivative of benzidin, tolidin, dianisidin, diaminostilbenedisulfonic acid, diaminodiphenylether, diaminodiphenylamin, aminobenzoyl-m-phenylenediamin, azooxyanilin, azooxytoluidin, diaminodiphenylurea, diaminodiphenylthiourea, etc.

As 2:5:7-aminonaphtholsulfonic compound can be employed the 2:5:7-aminonaphtholsulfonic acid

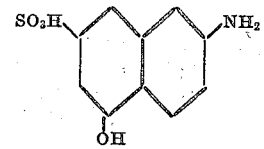

2:5:1:7-aminonaphtholdisulfonic acid

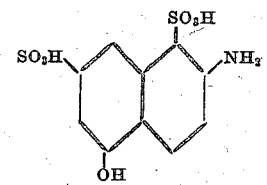

one of the following derivatives of 2:5:7-aminonaphtholsulfonic acid:

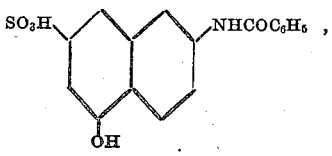

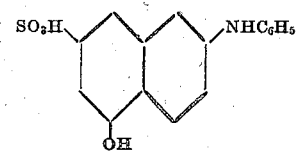

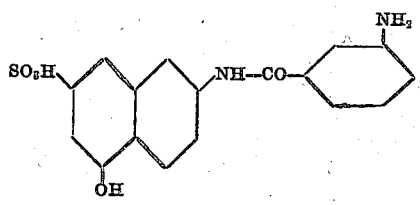

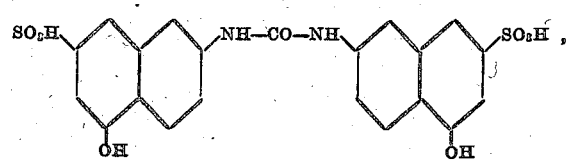

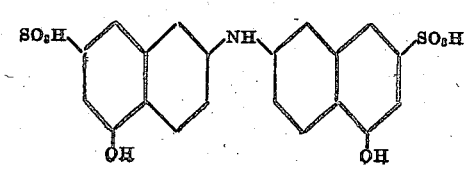

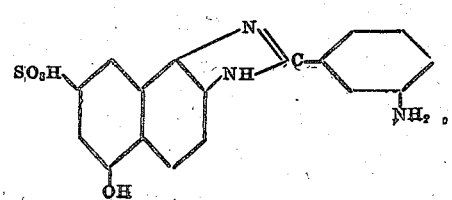

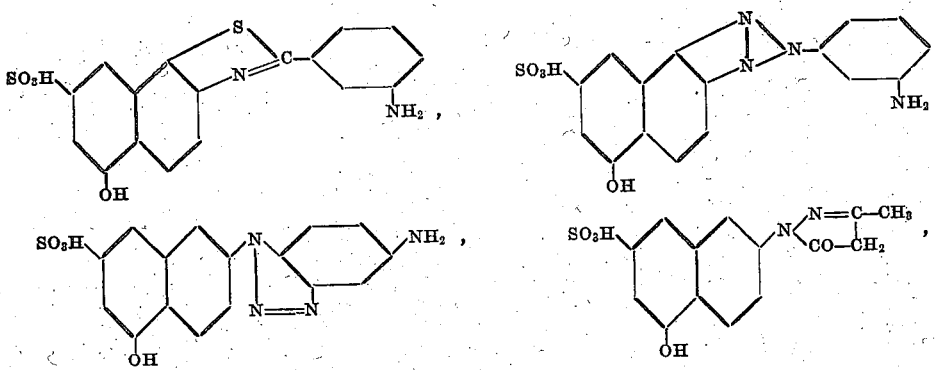

or one of the corresponding derivatives of 2:5:1:7-aminonaphtholdisulfonic acid.

The new dyestuffs are intensely colored powders yielding with concentrated sulfuric acid intensely colored solutions and dissolving in water with colorations which are changed intensively on addition of sodium carbonate or of soda lye, and dyeing cotton, wool, silk, mixed goods, straw, wood and paper various tints, according to the methods used for the known substantive dyestuffs.

The invention is illustrated by the following examples:

*Example 1.*—18.4 kg. benzidin are tetrazotized and as usual combined with 14.4 kg. salicylic acid to an intermediate product; this latter is acidulated with hydrochloric acid till it shows on Kongo a weakly acid reaction and poured into a paste of 26 kg. 2:5:7-aminonaphtholmonosulfonic acid, showing also a weakly acid reaction on Kongo. After the combination is effected, the mass is made alkaline by addition of 20 kg. sodium carbonate, the dyestuff is salted out, separated by filtration and redissolved. To the dyestuff solution are added at first 30 kg. sodium carbonate and afterward the diazo-compound derived from 23.3 kg. orthoaminosulfosalicylic acid. The resulting trisazodyestuff isolated as usual dyes unmordanted cotton brown tints.

*Example 2.*—The tetrazoderivative of 18.4 kg. benzidin is poured into a paste of 50 kg. 2:5:7-aminonaphtholsulfonic acid, showing a weakly acid reaction on Kongo, and the excess of mineral acid is gradually neutralized with sodium acetate. The disazodyestuff is separated by filtration, dissolved again with 60 kg. sodium carbonate and into the thus obtained solution is poured the diazoderivative of 37.8 kg. orthoaminophenolsulfonic acid. The trisazodyestuff isolated in the ordinary way yields on unmordanted cotton heliotrope tints.

*Example 3.*—Into a solution of tetrazodiphenyl derived from 18.4 kg. benzidin is poured a thin spout of a solution of 32 kg. 1:8:3:6-aminonaphtholdisulfonic acid showing a weak acid reaction on litmus, care being taken to stir well. After a stirring of about 12 hours the mass is poured into a solution of 32 kg. 1:8:2:4-aminonaphtholdisulfonic acid and 30 kg. sodium carbonate in water. The disazodyestuff is salted out, separated by filtration, dissolved again with 20 kg. sodium carbonate and into the solution thus obtained is poured a solution of the diazo-compound derived from 15.4 kg. 4:2:1-nitroaminophenol. The trisazodyestuff isolated in the usual manner dyes unmordanted cotton gray-blue tints.

Instead of the diazophenolderivatives indicated in the examples, there can be employed the corresponding diazoacidylphenol derivatives which are able to combine more easily, the acidyl-group being split off afterward by saponification.

The new dyestuffs are not only suitable for dyeing cotton, wool, silk and mixed goods, straw, wood, paper, leather, etc., like the known substantive dyestuffs, but also for the production of lakes and as parent materials for the production of valuable new derivatives.

What we claim is:

1. The described process for the manufacture of substantive polyazodyestuffs consisting in combining an aromatic orthooxydiazocompound with a disazodyestuff containing at least one azodyestuff component able to combine with two diazogroups appertaining to two different diazobodies.

2. The described process for the manufacture of substantive polyazodyestuffs consisting in combining an aromatic orthooxydiazocompound with a disazodyestuff containing at least one aminonaphtholsulfonic component.

3. The described process for the manufacture of substantive polyazodyestuffs consisting in combining an aromatic orthooxydiazocompound with a disazodyestuff containing a 2:5:1:7-aminonaphtholsulfonic component.

4. The described process for the manufacture of substantive polyazodyestuffs consisting in combining an aromatic orthooxydiazocompound with a disazodyestuff containing a 2:5:1:7-aminonaphtholdisulfonic component.

5. As new products the described substantive polyazodyestuffs derived from a disazodyestuff and an aromatic orthooxydiazocompound, which constitute deep colored powders yielding with concentrated sulfuric acid deep colored solutions and dissolving in water with colorations which are changed intensively on addition of sodium carbonate or of soda lye and dye cotton, wool, silk, mixed goods, straw, wood and paper various tints according to the methods used for the known substantive dyestuffs.

6. As new products the described substantive polyazodyestuffs derived from an aromatic orthooxydiazocompound and a disazodyestuff containing at least one aminonaphtholsulfonic component, which constitute deep colored powders yielding with concentrated sulfuric acid deep colored solutions and dissolving in water with colorations which are changed intensively on addition of sodium carbonate or of soda lye and dye cotton, wool, silk, mixed goods, straw, wood and paper various tints according to the methods used for the known substantive dyestuffs.

7. As new products the described substantive polyazodyestuffs derived from an aromatic orthooxydiazocompound and a disazodyestuff containing a 2:5:7-aminonaphtholsulfonic component, which constitute deep colored powders yielding with concentrated sulfuric acid deep colored solutions and dissolving in water with colorations which are changed intensively on addition of sodium carbonate or of soda lye and dye cotton, wool, silk, mixed goods, straw, wood and paper various tints according to the methods used for the known substantive dyestuffs.

8. As new products the described substantive polyazodyestuffs derived from an aromatic orthooxydiazocompound and a disazodyestuff containing a 2:5:1:7-aminonaphtholdisulfonic component, which constitute deep colored powders yielding with concentrated sulfuric acid deep colored solutions and dissolving in water with colorations which are changed intensively on addition of sodium carbonate or of soda lye and dye cotton, wool, silk, mixed goods, straw, wood and paper various tints according to the methods used for the known substantive dyestuffs.

In witness whereof we have hereunto signed our names this 17th day of September, 1915, in the presence of two subscribing witnesses.

EUGEN ANDERWERT.
Dr. HERMANN FRITZSCHE.
Dr. HEINRICH SCHOBEL.

Witnesses:
ARNOLD ZUBER,
AMAND RITTER.